US012467611B1

(12) United States Patent
Hsieh et al.

(10) Patent No.: US 12,467,611 B1
(45) Date of Patent: Nov. 11, 2025

(54) CEILING FAN LAMP QUICK ASSEMBLY STRUCTURE

(71) Applicant: HOTECK INC., Taichung (TW)

(72) Inventors: Lung-Fa Hsieh, Taichung (TW); Yu-Chen Hsieh, Taichung (TW); Min-Yuan Hsiao, Taichung (TW); Yu-Min Cho, Taichung (TW); Ying-Pin Chiang, Taichung (TW); Yu-Ting Ting, Taichung (TW)

(73) Assignee: HOTECK INC., Taichung (TW)

( * ) Notice: Subject to any disclaimer, the term of this patent is extended or adjusted under 35 U.S.C. 154(b) by 0 days.

(21) Appl. No.: 19/093,279

(22) Filed: Mar. 28, 2025

(30) Foreign Application Priority Data

Jan. 2, 2025 (TW) ................................ 114200007

(51) Int. Cl.

| | |
|---|---|
| ***F21V 21/08*** | (2006.01) |
| ***F21V 17/10*** | (2006.01) |
| ***F21V 33/00*** | (2006.01) |
| *F21Y 105/18* | (2016.01) |

(52) U.S. Cl.
CPC ........ *F21V 21/0832* (2013.01); *F21V 17/104* (2013.01); *F21V 33/0096* (2013.01); *F21Y 2105/18* (2016.08)

(58) Field of Classification Search
CPC ............... F21V 21/0832; F21V 17/104; F21V 33/0096; F21Y 5/18
See application file for complete search history.

(56) References Cited

U.S. PATENT DOCUMENTS

| | | | | |
|---|---|---|---|---|
| 4,645,286 | A * | 2/1987 | Isban | H02G 3/20 439/537 |
| 10,756,453 | B2 * | 8/2020 | Kimmel | H02G 3/20 |
| 2018/0058476 | A1 * | 3/2018 | Jones | F04D 25/0693 |
| 2025/0237236 | A1 * | 7/2025 | Botkin | F04D 29/646 |

FOREIGN PATENT DOCUMENTS

CN 215927851 U * 3/2022

* cited by examiner

*Primary Examiner* — Zheng Song
(74) *Attorney, Agent, or Firm* — Li & Cai Intellectual Property Office

(57) ABSTRACT

A ceiling fan lamp quick assembly structure includes a fixing base, a connecting base, and a lighting module. The fixing base is connected to a ceiling fan, and includes a first mounting plate and first engaging structures disposed on the first mounting plate. The connecting base is connected to the lighting module, and includes a second mounting plate that abuts against the first mounting plate and second engaging structures disposed on the second mounting plate. The first engaging structures respectively have first through holes and first hooks respectively located in the first through holes. The second engaging structures respectively have second through holes and second hooks respectively located in the second through holes. The first hooks can penetrate the second through holes, the second hooks can penetrate the first through holes, and the first hooks and the second hooks can be engaged with each other, respectively.

9 Claims, 7 Drawing Sheets

CEILING FAN LAMP QUICK ASSEMBLY STRUCTURE

CROSS-REFERENCE TO RELATED PATENT APPLICATION

This application claims the benefit of priority to Taiwan Patent Application No. 114200007, filed on Jan. 2, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ceiling fan lamp, and more particularly to a ceiling fan lamp quick assembly structure.

BACKGROUND OF THE DISCLOSURE

When existing ceiling fan lamps are installed, it is often necessary to assemble various components of the ceiling fan (such as a motor, ceiling fan blades, etc.) and the lamp together through multiple fasteners (such as screws), and then install the assembled ceiling fan on the ceiling. However, since the existing ceiling fan lamps are usually installed onto the ceiling fans by threaded fastening, when installing the ceiling fan lamp on the ceiling fan, an operator must support the ceiling fan lamp with one hand and use a tool such as a screwdriver with the other hand to fasten the screws, thus causing the operation to be very cumbersome, inconvenient, time-consuming, and labor-intensive.

Therefore, how to overcome the above-mentioned problems through improvements to the structural design of ceiling fan lamps has become one of the important issues to be addressed in the relevant industry.

SUMMARY OF THE DISCLOSURE

In response to the above-referenced technical inadequacies, the present disclosure provides a ceiling fan lamp quick assembly structure.

In order to solve the above-mentioned problems, one of the technical aspects adopted by the present disclosure is to provide a ceiling fan lamp quick assembly structure for installing a lamp on a ceiling fan. The ceiling fan lamp quick assembly structure includes a fixing base, a connecting base, and a lighting module. The fixing base is connected to the ceiling fan, and the fixing base includes a first mounting plate and a plurality of first engaging structures. The first mounting plate has a top surface and a bottom surface opposite to each other, and defines a central axis. The plurality of first engaging structures are disposed on the first mounting plate and arranged on a virtual circumference centered on the central axis. Each of the plurality of first engaging structures includes a first through hole, a first hook, a first positioning member, and a second positioning member. The first through hole is formed on the first mounting plate, and the first hook is accommodated in the first through hole. One side of the first hook in a virtual circumferential direction has a first connecting portion connected to a hole edge of the first through hole, and the first hook further includes a first engaging piece connected to one end of the first connecting portion and extending in a direction opposite to the first connecting portion. The first engaging piece protrudes from the bottom surface of the first mounting plate. A gap between the first engaging piece and the bottom surface of the first mounting plate is defined as a first engaging gap. The first positioning member and the second positioning member are respectively disposed on the first engaging piece and at a position on the first mounting plate adjacent to the first connecting portion. The connecting base includes a second mounting plate and a plurality of second engaging structures. The second mounting plate has a top surface and a bottom surface opposite to each other. The top surface of the second mounting plate abuts against the bottom surface of the first mounting plate. The plurality of second engaging structures are disposed on the second mounting plate and correspond to the plurality of first engaging structures. Each of the plurality of second engaging structures includes a second through hole, a second hook, a third positioning member, and a fourth positioning member. The second through hole is formed on the second mounting plate, and the second hook is accommodated in the second through hole. One side of the second hook in the virtual circumferential direction and the direction opposite to the first connecting portion has a second connecting portion connected to a hole edge of the second through hole, and a second engaging piece connected to one end of the second connecting portion and extending in a direction opposite to the second connecting portion. An opening direction of the second hook is opposite to an opening direction of the first hook. The second engaging piece protrudes from the top surface of the second mounting plate. A gap between the second engaging piece and the top surface of the second mounting plate is defined as a second engaging gap. The third positioning member and the fourth positioning member are respectively disposed on the second engaging piece and a position on the second mounting plate adjacent to the second connecting portion. The lighting module is disposed on the ceiling fan lamp quick assembly structure. The lighting module is detachably mounted on the ceiling fan through the cooperation between the connecting base and the fixing base. Heights of the plurality of first engaging gaps are configured so that the plurality of second engaging pieces and the second mounting plate are inserted into the plurality of first engaging gaps, and heights of the plurality of second engaging gaps are configured so that the plurality of first engaging pieces and the first mounting plate are inserted into the plurality of second engaging gaps. The plurality of first hooks are inserted into the plurality of second through holes, and the plurality of second hooks are inserted into the plurality of first through holes. When an operator mounts the connecting base on the fixing base, the operator aligns openings of the plurality of second hooks with the plurality of first hooks, and then rotates the connecting base along an assembly direction that enables the plurality of second hooks and the plurality of first hooks to engage with each other, so that the connecting base is rotated to an assembly position that enables the plurality of first engaging structures and the plurality of second engaging structures to engage with each other, and enables the plurality of first hooks to penetrate the plurality of second through holes and engage with an edge of the second mounting plate, and the plurality of second hooks to penetrate the plurality of first through holes and engage with an edge of the first mounting plate. When the connecting base is located in the assembly position, positions of the plurality of first positioning members correspond to positions of the plurality of fourth positioning members, and positions of the plurality of second positioning members correspond to positions of the plurality of third positioning members. The plurality of first positioning members are correspondingly engaged with the plurality of fourth positioning members, and the plurality of second positioning members are engaged with the plurality of third positioning members to position the connecting base in the assembly position.

The beneficial effect of the present disclosure resides in that, the plurality of first engaging structures of the fixed base and the plurality of second engaging structures of the connecting base respectively have a first hook and a second hook that can be correspondingly engaged to each other, a first positioning member and a fourth positioning member that can be engaged to each other and fixed in position, and a second positioning member and a third positioning member that can be engaged to each other and fixed in position. Therefore, the operator can directly mount the connecting base on the fixed base in a rotational manner without using tools. Moreover, the first and second engaging structures have the effect of dual engaging and positioning, and are not easily disengaged from each other, so as to be stably positioned.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
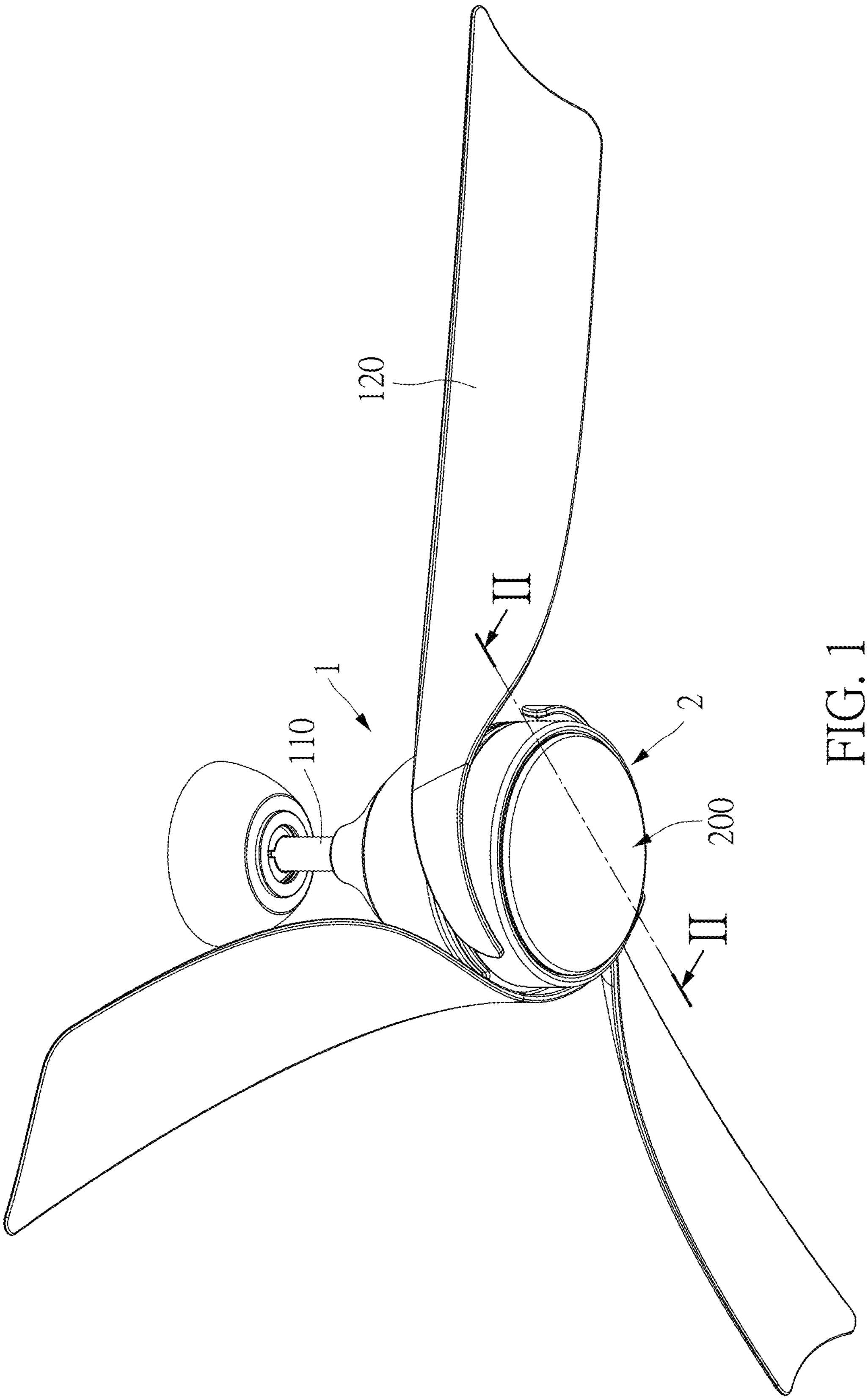
FIG. 1 is a schematic assembled perspective view of a ceiling fan having a ceiling fan lamp quick assembly structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 5, a first embodiment of the present disclosure provides a ceiling fan lamp quick assembly structure, which includes: a ceiling fan 1 and a lamp 2. The ceiling fan 1 includes: a suspension assembly 110, a plurality of fan blades 120, and a driving motor not shown in the figures. The lamp 2 includes: a lighting module 200 and a lamp quick assembly structure 300. Through the lamp quick assembly structure 300, the lighting module 200 can be easily mounted on the ceiling fan 1 or removed from the ceiling fan 1.

Figure 2:
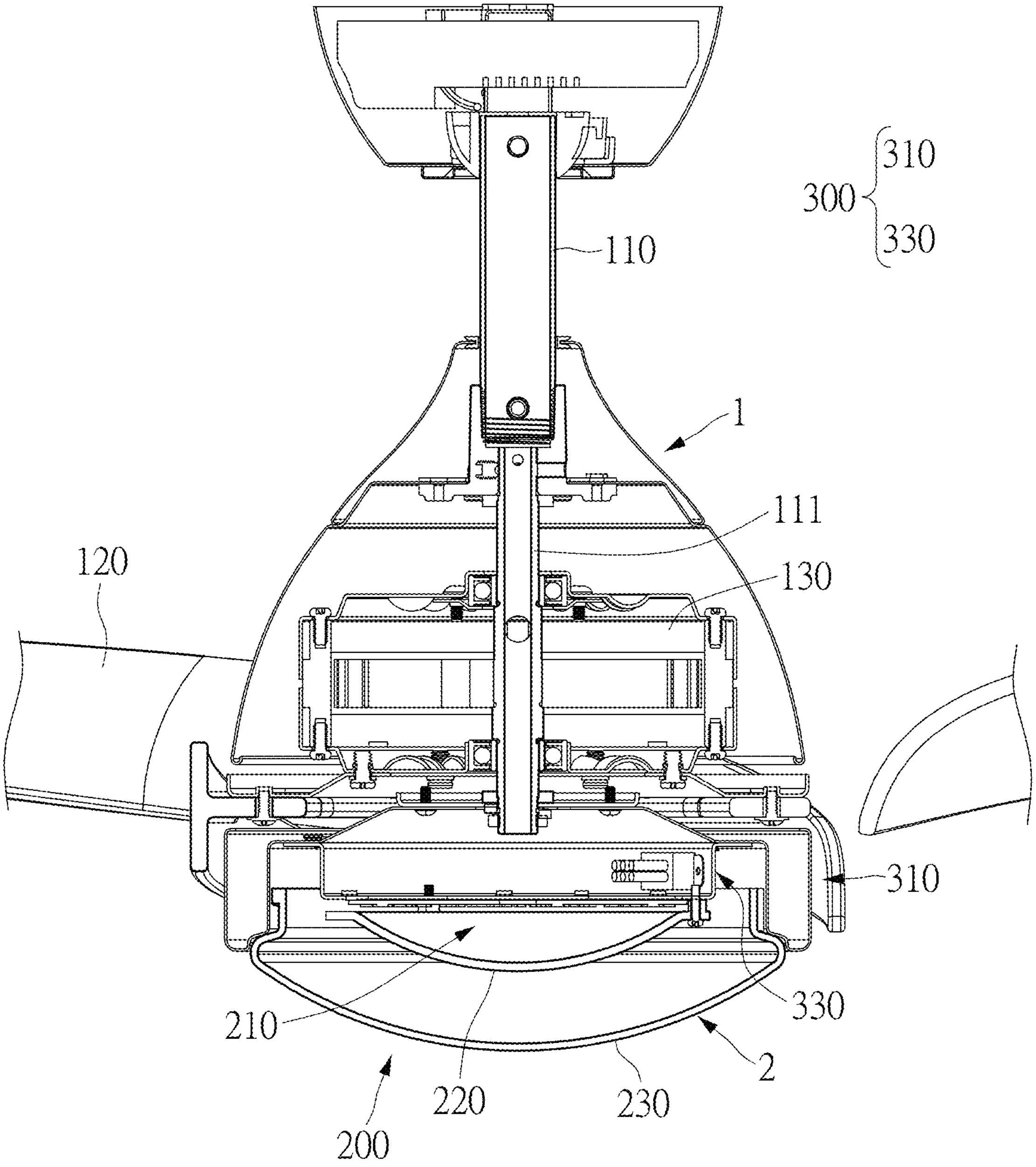
FIG. 2 is a schematic cross-sectional view of an assembly taken along line II-II of FIG. 1.

As shown in FIG. 2, the lamp quick assembly structure 300 includes: a fixing base 310, a connecting base 330, a plurality of first engaging structures 320 disposed on the fixing base 310, and a plurality of second engaging structures 340 disposed on the connecting base 330. In this embodiment, the fixing base 310 is connected to a bottom end of a motor shaft 111 of the suspension assembly 110 of the ceiling fan 1, the connecting base 330 is detachably mounted on the fixing base 310, and the lighting module 200 is disposed on the lamp quick assembly structure 300, such that the lamp 2 can be mounted at a bottom position of the ceiling fan 1 through the cooperation between the connecting base 330 and the fixing base 310. However, the present disclosure is not limited thereto. For example, the fixing base 310 can also be disposed at different positions of the ceiling fan 1, and the lamp 2 can be mounted at different positions of the ceiling fan 1.

In this embodiment, the fixing base 310 includes a first mounting plate 311, a surrounding portion 312, and a top plate 314. Here, the top plate 314 is located at an upper end of the center of the fixing base 310. The top plate 314 has a notch portion 315 located at the center of the top plate 314 and a plurality of locking holes 316 that surround the notch portion 315. The plurality of locking holes 316 are used to cooperate with fixing screws to connect the fixing base 310 to the ceiling fan 1. The first mounting plate 311 is substantially connected to the periphery of the top plate 314. A top surface and a bottom surface opposite to each other can be defined on the first mounting plate 311. The bottom surface of the first mounting plate 311 is substantially flat, such that a flat mounting surface can be provided. The surrounding portion 312 surrounds the first mounting plate 311 and extends in a direction away from the bottom surface of the first mounting plate 311, such that an inner side of the surrounding portion 312 has a substantially vertical annular inner wall.

Figure 3:
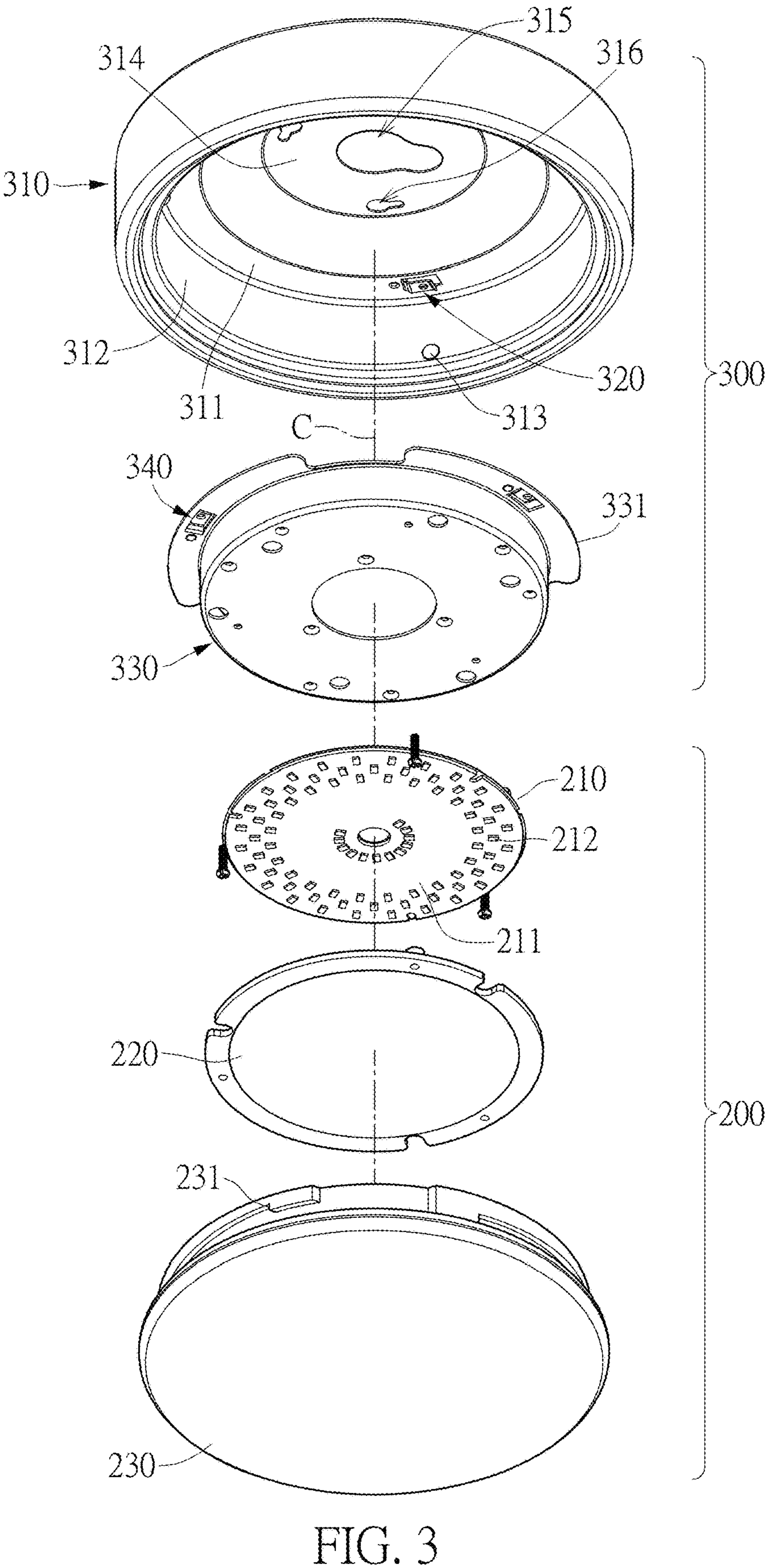
FIG. 3 is a schematic exploded perspective view of the ceiling fan lamp quick assembly structure according to the present disclosure.
Figure 4:
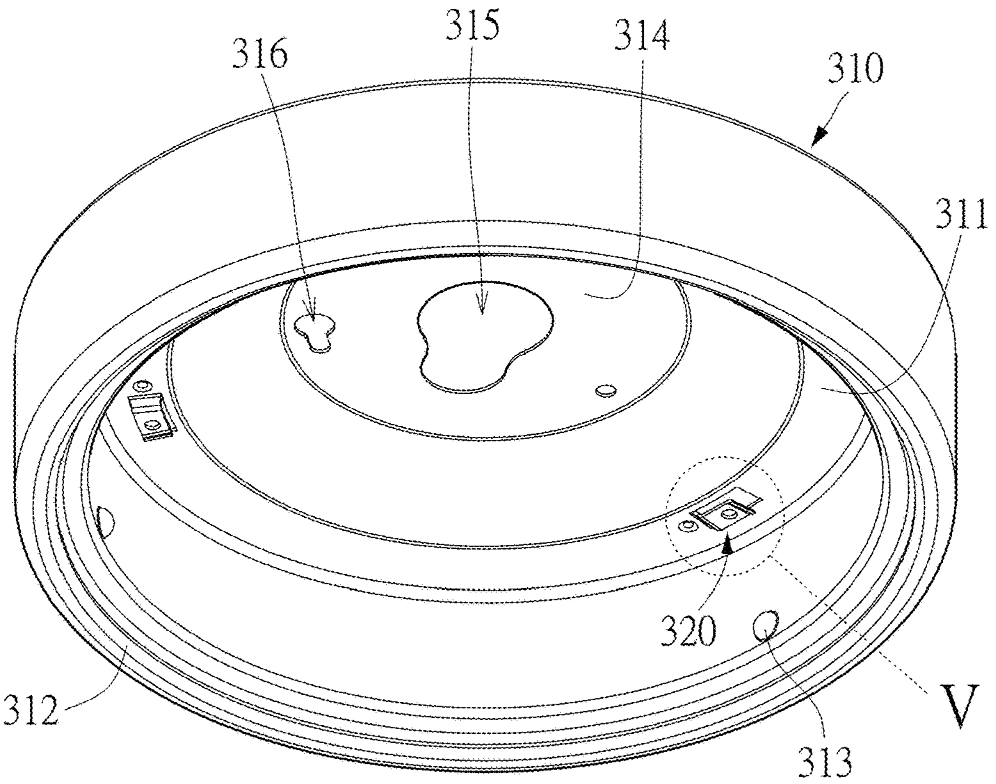
FIG. 4 is a schematic perspective view of a fixing base of the quick assembly structure of the ceiling fan lamp according to the present disclosure.
Figure 5:
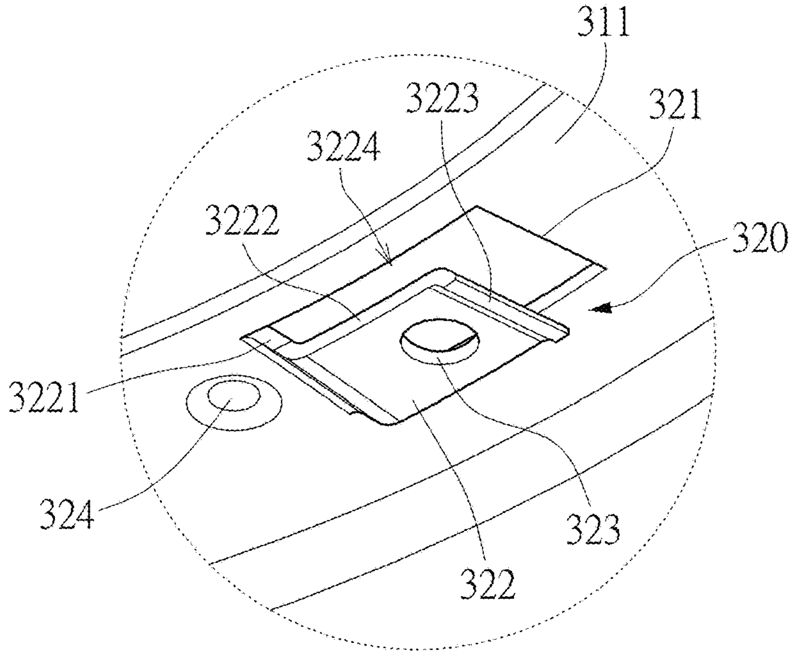
FIG. 5 is a schematic partially enlarged view of portion V of FIG. 4.

As shown in FIG. 3, FIG. 4 and FIG. 5, the plurality of first engaging structures 320 are disposed on the first mounting plate 311 and arranged on a virtual circle centered on a central axis C of the first mounting plate 311. Each of the first engaging structures 320 has a first through hole 321, a first hook 322, a first positioning member 323, and a second positioning member 324. The plurality of first through holes 321 are formed on the first mounting plate 311, the plurality of first hooks 322 are integrally formed and connected to the first mounting plate 311, and the plurality of first hooks 322 are respectively accommodated in the plurality of first through holes 321. One side of each of the first hooks 322 in a virtual circumferential direction has a first connection portion 3221 connected to a hole edge of the first through hole 321 and a first engaging piece 3222 connected to one end of the first connection portion 3221 and extending in a direction opposite to the first connection portion 3221. The first engaging piece 3222 protrudes from the bottom surface of the first mounting plate 311, and a gap between the first engaging piece 3222 and the bottom surface of the first mounting plate 311 is defined as a first engaging gap 3224. One side of the first engaging gap 3224 opposite to the first connecting portion 3221 is defined as an opening of the first hook 322. One end of the first engaging piece 3222 is further bent obliquely in a direction away from the bottom surface of the first mounting plate 311 to form a first guiding bevel 3223, such that the opening defined by the first engaging gap 3224 is bell-shaped.

The first positioning member 323 is disposed on the first engaging piece 3222, and the second positioning member 324 is disposed at a position on the first mounting plate 311 adjacent to the first connecting portion 3221. Moreover, in this embodiment, the first positioning member 323 is a circular hole or a groove formed on the first engaging piece 3222, and the second positioning member 324 is an engaging protrusion (e.g., a convex portion) formed on the first mounting plate 311 and protruding from the top surface of the first mounting plate 311. The first positioning member 323 and the second positioning member 324 are used to engage with corresponding positioning members on the second engaging structure 340, so as to position the connecting base 330.

Figure 6:
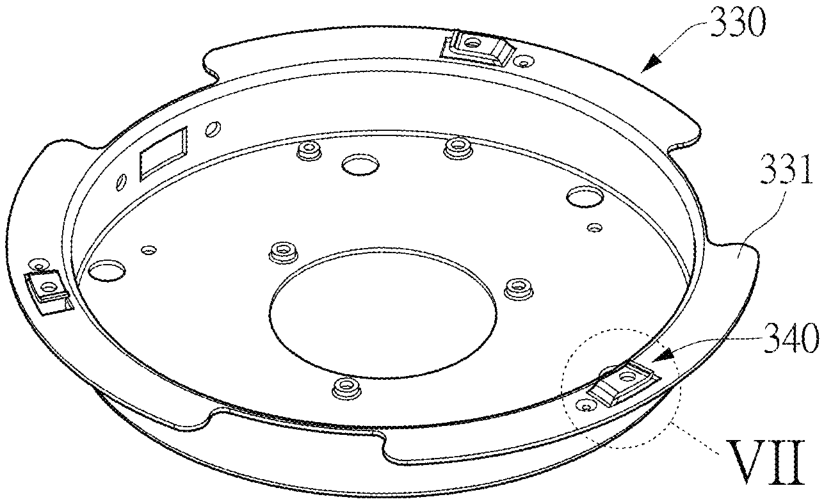
FIG. 6 is a schematic perspective view of a connecting base of the ceiling fan lamp quick assembly structure according to the present disclosure.
Figure 7:
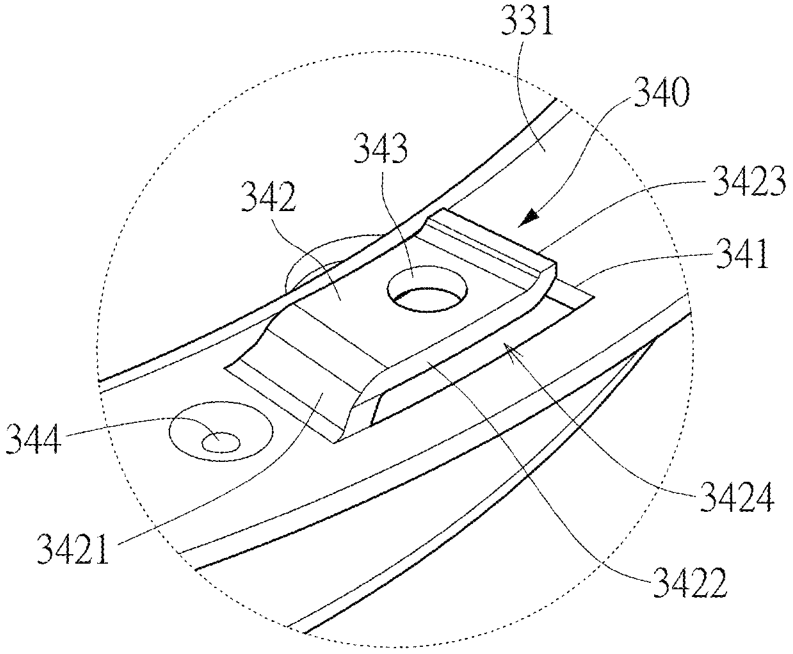
FIG. 7 is a schematic partially enlarged view of portion VII of FIG. 6.

As shown in FIG. 2 and FIG. 3, and in FIG. 6 and FIG. 7, in this embodiment, the lighting module 200 is placed at the bottom of the lamp quick assembly structure 300, and the lighting module 200 is detachably mounted on the fixing base 310 through the connecting base 330. The center of the connecting base 330 has a main body portion that is substantially circular, the lighting module 200 is disposed at the bottom of the main body portion in the center of the connecting base 330, and a plurality of second mounting plates 331 extend outward from the top of the main body portion of the connecting base 330. A top surface and a bottom surface opposite to each other can be defined on each of the second mounting plates 331. The top surfaces of the second mounting plates 331 are flat and can abut against the bottom surface of the first mounting plate 311.

The plurality of second engaging structures 340 are respectively disposed on the second mounting plates 331. The positions of the second engaging structures 340 correspond to the positions of the first engaging structures 320, such that the second engaging structures 340 can engage with the first engaging structures 320, thereby allowing the connecting base 330 to be detachably mounted on the fixing base 310.

Each of the second engaging structures 340 has a second through hole 341, a second hook 342, a third positioning member 343, and a fourth positioning member 344. Here, the second through hole 341 is formed on a corresponding second mounting plate 331, and the second hook 342 is accommodated in the second through hole 341. One side of the second hook 342 in the virtual circumferential direction has a second connection portion 3421 connected to a hole edge of the second through hole 341 and a second engaging piece 3422 connected to the end of the second connection portion 3421 and extending in a direction opposite to the second connection portion 3421, such that an opening direction of the second hook 342 is opposite to an opening direction of the first hook 322.

The second engaging piece 3422 of the second hook 342 protrudes from the top surface of the second mounting plate 331, and a gap between the second engaging piece 3422 and the top surface of the second mounting plate 331 is defined as a second engaging gap 3424. One side of the second engaging gap 3424 opposite to the second connecting portion 3421 is defined as an opening of the second hook 342. One end of the second engaging piece 3422 is further bent obliquely in a direction away from the top surface of the second mounting plate 331 to form a second guiding bevel 3423.

The third positioning member 343 and the fourth positioning member 344 are respectively disposed on the second engaging piece 3422 and a position on the second mounting plate 331 adjacent to the second connecting portion 3421. In this embodiment, the third positioning member 343 is a circular hole or a groove formed on the second engaging piece 3422, and the fourth positioning member 344 is an engaging protrusion (e.g., a convex portion) formed on the second mounting plate 331 and protruding from the bottom surface of the second mounting plate 331.

Figure 8:
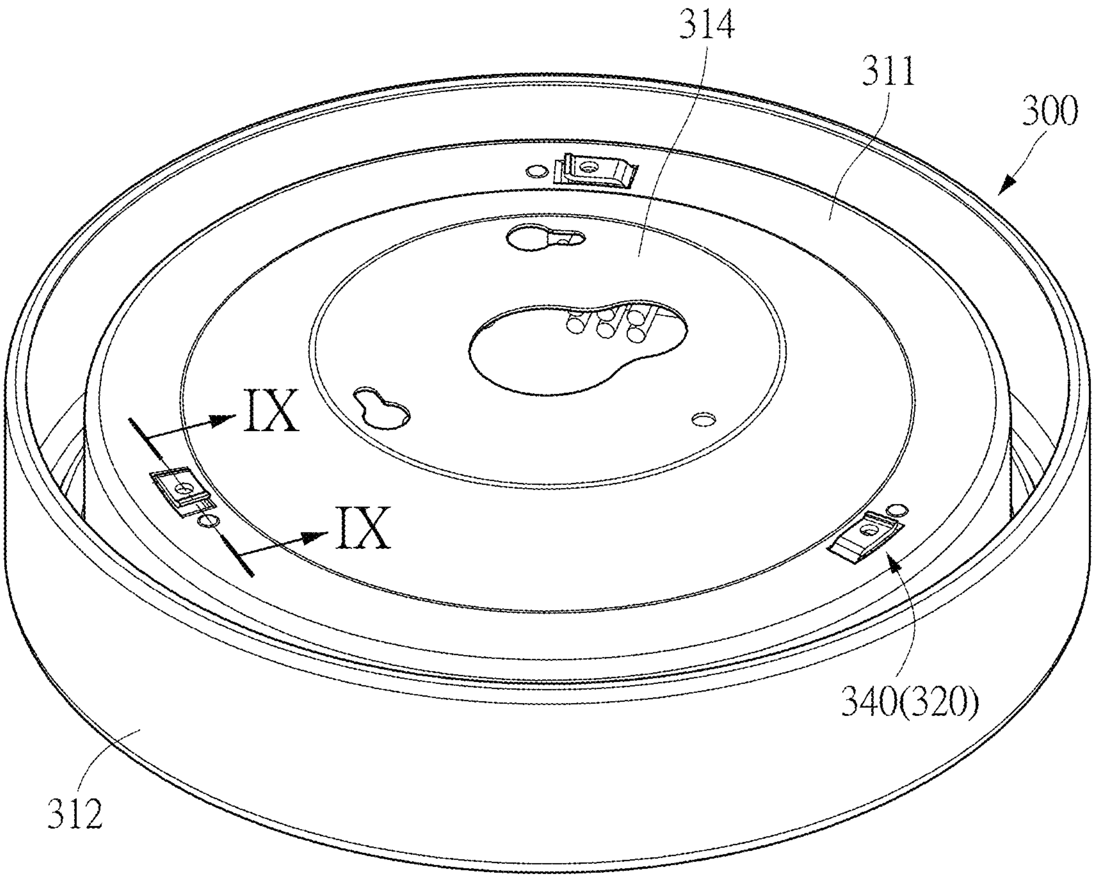
FIG. 8 is a schematic perspective view showing a state of assembly of the fixing base and the connecting base of the ceiling fan lamp quick assembly structure according to the present disclosure.
Figure 9:
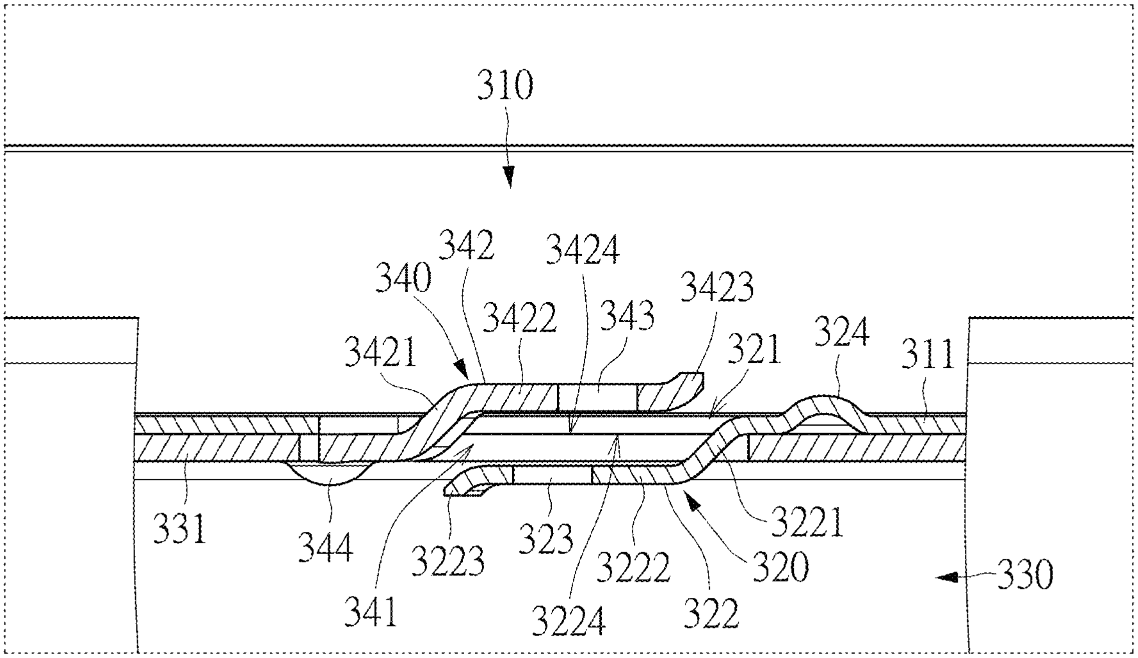
FIG. 9 is a partially cross-sectional view taken along line IX-IX of FIG. 8 showing a state before a first engaging structure and a second engaging structure are engaged.
Figure 10:
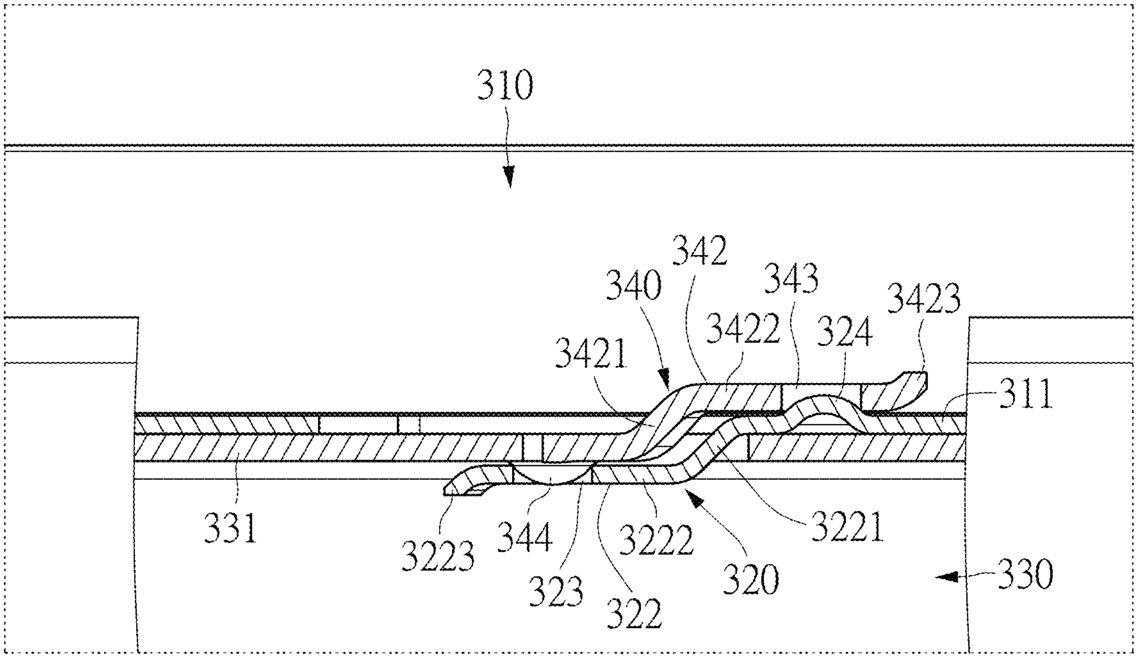
FIG. 10 is a partial cross-sectional schematic diagram taken along line IX-IX of FIG. 8 showing the first engaging structure and the second engaging structure in an engaged state.

Next, the mounting and detaching processes of the connecting base 330 and the fixing base 310 of the lamp quick assembly structure 300 for a ceiling fan of the present disclosure are described. As shown in FIG. 8 to FIG. 10, in the lamp quick assembly structure 300 of the present disclosure, by the plurality of second engaging structures 340 and the plurality of first engaging structures 320 respectively engaging with each other, the connecting base 330 is mounted on the fixing base 310. The first hooks 322 are configured to respectively penetrate into the second through holes 341, and the second hooks 342 are configured to respectively penetrate into the first through holes 321. Furthermore, the height of the first engaging gaps 3224 of the plurality of first hooks 322 is configured so that the second engaging piece 3422 and the second mounting plate 331 can be inserted into the first engaging gaps 3224; and the height of the second engaging gaps 3424 of the plurality of second hooks 342 is configured so that the first engaging piece 3222 and the first mounting plate 311 can be inserted into the second engaging gaps 3424.

Therefore, when the operator mounts the connecting base 330 on the fixing base 310, the operator can first align the openings of the plurality of second hooks 342 with the plurality of first hooks 322, and then rotate the connecting base 330 along an assembly direction that enables the plurality of second hooks 342 and the plurality of first hooks 322 to respectively engage with each other. Accordingly, the plurality of first hooks 322 penetrate the multiple second through holes 341, and the plurality of second hooks 342 penetrate the multiple first through holes 321. Furthermore, the first engaging piece 3222 of each of the first hooks 322 is engaged in the second engaging gap 3424 of a corresponding second hook 342, and the second engaging piece 3422 of each of the second hooks 342 is engaged in the first engaging gap 3224 of a corresponding first hook 322. As shown in FIG. 10, when the connecting base 330 is rotated to an assembly position in which the plurality of first engaging structures 320 and the plurality of second engaging structures 340 are fully engaged, the plurality of first hooks 322 can respectively penetrate into the plurality of second through holes 341 and engage with an edge of the second mounting plate 331, and the plurality of second hooks 342 can respectively penetrate into the plurality of first through holes 321 and engage with an edge of the first mounting plate 311.

Furthermore, when the connecting base 330 is in the assembly position, positions of the first positioning members 323 of the plurality of first engaging structures 320 correspond to positions of the fourth positioning members 344 of the plurality of second engaging structures 340, and positions of the plurality of second positioning members 324 correspond to positions of the plurality of third positioning members 343 of the second engaging structures 340. Therefore, when the operator rotates the connecting base 330 to the assembly position, the plurality of first positioning members 323 can be engaged with the plurality of fourth positioning members 344, and the plurality of second positioning members 324 can be engaged with the plurality of third positioning members 343, thereby enabling the plurality of first engaging structures 320 and the plurality of second engaging structures 340 to be mutually positioned.

It should be noted that, although the first positioning members 323 and the third positioning members 343 are defined as circular holes or grooves and the second positioning members 324 and the fourth positioning members 344 are defined as convex structures in this embodiment, the present disclosure is not limited thereto. In other embodiments not shown in the figures of the present disclosure, the first positioning members 323 and the third positioning members 343 can be configured as convex portions, and the second positioning members 324 and the fourth positioning members 344 can be configured as circular holes or grooves that can cooperate with the first positioning members 323 and the third positioning members 343. That is to say, when the first positioning members 323 are circular holes or grooves, the fourth positioning members 344 are configured as engaging protrusions that can interfere with and engage with the circular holes or grooves of the first positioning members 323; on the other hand, when the first positioning members 323 are convex portions, the fourth positioning members 344 are configured as circular holes or grooves that can engage with the convex portions of the first positioning members 323. As for the second positioning members 324 and the third positioning members 343, they also adopt the same complementary pairing configuration as the first positioning members 323 and the fourth positioning members 344.

It is worth noting that, in the present embodiment, the fixing base 310 and the connecting base 330 are both integrally formed and can be made by stamping a metal plate or by being integrally formed using an engineering plastic. Therefore, the fixing base 310 and the connecting base 330 do not include additional moving parts, and have simple structures. Furthermore, since the fixing base 310 and the connecting base 330 are made of high-strength and elastic metal plates or engineering plastic materials, the first hook 322 and the second hook 342 are bendable and have elasticity. Therefore, when the first engaging structure 320 and the second engaging structure 340 are engaged with each other, the first hook 322 and the second hook 342 can be bent, such that the first positioning member 323 can be engaged with the fourth positioning member 344, and the second positioning member 324 can be engaged with the third positioning member 343, and the first positioning member 323 and the fourth positioning member 344 are maintained to be engaged through the elasticity of the first hook 322 and the second positioning member 324 and the third positioning member 343 are also maintained to be engaged through the elasticity of the second hook 342.

Furthermore, as shown in FIG. 10, after the first engaging structure 320 and the second engaging structure 340 are engaged with each other, the first engaging gap 3224 of the first hook 322 engages with the edge of the second mounting plate 331, and the second engaging gap 3424 of the second hook 342 also engages with the edge of the first mounting plate 311. Therefore, the first hook 322 can limit the second mounting plate 331 from moving in a direction away from the first mounting plate 311, and the second hook 342 can also limit the first mounting plate 311 from moving away from the second mounting plate 331. In addition, since the protruding direction of the second positioning member 324 and the protruding direction of the fourth positioning member 344 are opposite to each other, the relative engagement direction of the first positioning member 323 and the fourth positioning member 344 and the relative engagement direction of the second positioning member 324 and the third positioning member 343 are opposite to each other. Accordingly, the first engaging structure 320 and the second engaging structure 340 have two dual-engaging and positioning structures in opposite directions, thereby achieving the effect of preventing the first engaging structure 320 and the second engaging structure 340 from being detached from each other due to the vibration of the ceiling fan 1 during operation.

An outer lamp cover 230 of the lighting module 200 is disposed on the fixing base 310. The lighting module 200 includes a light-emitting member 210, an inner lamp cover 220, the outer lamp cover 230, and circuit components not shown in the figure. The light-emitting member 210 includes a circuit substrate 211 and a plurality of light-emitting chips 212 disposed on the circuit substrate 211. The inner lamp cover 220 covers the light-emitting member 210 and allows light generated by the light-emitting member 210 to pass through the inner lamp cover 220. The outer lamp cover 230 covers the entire light-emitting member 210 and the inner lamp cover 220, and allows the light generated by the light-emitting member 210 to pass through the outer lamp cover 230.

In order to cooperate with the lighting module 200, a diameter of the annular inner wall of the surrounding portion 312 of the fixing base 310 of this embodiment is configured to be larger than a diameter of the connecting base 330, and a diameter of the light-emitting member 210 and the inner lamp cover 220 of the lighting module 200. In addition, the connecting base 330 and the light-emitting member 210 and the inner lamp cover 220 of the lighting module 200 are completely accommodated on the inner side of the annular inner wall of the surrounding portion 312. Therefore, the annular inner wall of the surrounding portion 312 and the bottom surface of a portion of a plate body at the top of the fixing base 310 form a reflecting surface that can be used to reflect the light generated by the light-emitting member 210.

Furthermore, in the present embodiment, a top portion of the outer lamp cover 230 of the lighting module 200 is configured to have a cylindrical shape and can be inserted into the inner side of the surrounding portion 312. A plurality of connecting grooves 231 are formed on an outer side of the top portion of the outer lamp cover 230, and a plurality of engaging portions 313 protruding from the annular inner wall of the surrounding portion 312 are formed at positions of the annular inner wall of the surrounding portion 312 corresponding to the plurality of connecting grooves 231. The plurality of engaging portions 313 can be respectively engaged with the plurality of connecting grooves 231 to fix the outer lamp cover 230 below the surrounding portion 312 of the fixing base 310.

Beneficial Effects of the Embodiments

The beneficial effect of the present disclosure is that, the ceiling fan lamp quick assembly structure 300 of the present disclosure adopts a fixing base 310 and a connecting base 330 detachably connected to each other, the fixing base 310 and the connecting base 330 respectively have a first mounting plate 311 and a second mounting plate 331 that cooperate with each other, and a plurality of first engaging structures 320 and a plurality of second engaging structures 340 corresponding to each other are respectively arranged on the first mounting plate 311 and the second mounting plate 331. Each of the first engaging structures 320 has a first hook 322 and each of the second engaging structures 340 has a second hook 342 that can be engaged with each other, and a first positioning member 323 and a fourth positioning member 344, and a second positioning member 324 and a third positioning member 343 that can be mutually engaged and positioned, such that the operator can directly install the connecting base 330 on the fixing base 310 without using tools, and the first and second engaging structures 320 and 340 have the functions of dual engaging and positioning, anti-vibration, and anti-detachment, and can be stably positioned.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ceiling fan lamp quick assembly structure, for installing a lamp on a ceiling fan, the ceiling fan lamp quick assembly structure comprising:

a fixing base connected to the ceiling fan, wherein the fixing base includes:

a first mounting plate having a top surface and a bottom surface opposite to each other and defining a central axis; and a plurality of first engaging structures disposed on the first mounting plate and arranged on a virtual circumference centered on the central axis, wherein each of the plurality of first engaging structures includes a first through hole, a first hook, a first positioning member, and a second positioning member; wherein the first through hole is formed on the first mounting plate, and the first hook is accommodated in the first through hole; wherein one side of the first hook in a virtual circumferential direction has a first connecting portion connected to a hole edge of the first through hole, and the first hook further includes a first engaging piece connected to one end of the first connecting portion and extending in a direction opposite to the first connecting portion; wherein the first engaging piece protrudes from the bottom surface of the first mounting plate; wherein a gap between the first engaging piece and the bottom surface of the first mounting plate is defined as a first engaging gap; and wherein the first positioning member and the second positioning member are respectively disposed on the first engaging piece and at a position on the first mounting plate adjacent to the first connecting portion;

a connecting base, including:

a second mounting plate having a top surface and a bottom surface opposite to each other, wherein the top surface of the second mounting plate abuts against the bottom surface of the first mounting plate; and a plurality of second engaging structures disposed on the second mounting plate and corresponding to the plurality of first engaging structures, wherein each of the plurality of second engaging structures includes a second through hole, a second hook, a third positioning member, and a fourth positioning member; wherein the second through hole is formed on the second mounting plate, and the second hook is accommodated in the second through hole; wherein one side of the second hook in the virtual circumferential direction and the direction opposite to the first connecting portion has a second connecting portion connected to a hole edge of the second through hole, and a second engaging piece connected to one end of the second connecting portion and extending in a direction opposite to the second connecting portion; wherein an opening direction of the second hook is opposite to an opening direction of the first hook; wherein the second engaging piece protrudes from the top surface of the second mounting plate; wherein a gap between the second engaging piece and the top surface of the second mounting plate is defined as a second engaging gap; and wherein the third positioning member and the fourth positioning member are respectively disposed on the second engaging piece and a position on the second mounting plate adjacent to the second connecting portion; and a lighting module disposed on the ceiling fan lamp quick assembly structure, wherein the lighting module is detachably mounted on the ceiling fan through a cooperation between the connecting base and the fixing base;

wherein heights of the plurality of first engaging gaps are configured so that the plurality of second engaging pieces and the second mounting plate are inserted into the plurality of first engaging gaps, and heights of the plurality of second engaging gaps are configured so that the plurality of first engaging pieces and the first mounting plate are inserted into the plurality of second engaging gaps; wherein the plurality of first hooks are inserted into the plurality of second through holes, and the plurality of second hooks are inserted into the plurality of first through holes; wherein, when an operator mounts the connecting base on the fixing base, the operator aligns openings of the plurality of second hooks with the plurality of first hooks, and then rotates the connecting base along an assembly direction that enables the plurality of second hooks and the plurality of first hooks to respectively engage with each other, so that the connecting base is rotated to an assembly position that enables the plurality of first engaging structures and the plurality of second engaging structures to engage with each other, and enables the plurality of first hooks to penetrate the plurality of second through holes and engage with an edge of the second mounting plate, and the plurality of second hooks to penetrate the plurality of first through holes and engage with an edge of the first mounting plate;

wherein, when the connecting base is located in the assembly position, positions of the plurality of first positioning members correspond to positions of the plurality of fourth positioning members, positions of the plurality of second positioning members correspond to positions of the plurality of third positioning members; and wherein the plurality of first positioning members are correspondingly engaged with the plurality of fourth positioning members, and the plurality of second positioning members are engaged with the plurality of third positioning members to position the connecting base in the assembly position.

2. The ceiling fan lamp quick assembly structure according to claim 1, wherein the plurality of the first hooks are integrally formed and connected to the first mounting plate, and the plurality of the second hooks are integrally formed and connected to the second mounting plate.

3. The ceiling fan lamp quick assembly structure according to claim 2, wherein the plurality of first hooks and the first mounting plate, and the plurality of second hooks and the second mounting plate are made of elastic metal plates or engineering plastic materials, so that the plurality of first hooks and the plurality of second hooks are bendable and have elasticity.

4. The ceiling fan lamp quick assembly structure according to claim 3, wherein one of the plurality of first positioning members of each of the first engaging structures and a corresponding fourth positioning member of each of the second engaging structures is a circular hole or a groove, and another is a convex portion engaging with the circular hole or the groove of the first positioning member or the fourth positioning member; and wherein one of the plurality of second positioning members of each of the first engaging structures and a corresponding one of the plurality of third positioning members of each of the second engaging structures is a circular hole or a groove, and another is a convex portion engaging with the circular hole or the groove of the second positioning member or the third positioning member.

5. The ceiling fan lamp quick assembly structure according to claim 4, wherein a relative engagement direction of the plurality of first positioning members and the plurality of fourth positioning members is opposite to a relative engagement direction of the plurality of second positioning members and the plurality of third positioning members.

6. The ceiling fan lamp quick assembly structure according to claim 1, wherein the lighting module includes a light-emitting member and an inner lamp cover; and wherein the light-emitting member includes a circuit substrate and a plurality of light-emitting chips disposed on the circuit substrate, and the inner lamp cover covers the light-emitting member and allows light generated by the light-emitting member to pass through the inner lamp cover.

7. The ceiling fan lamp quick assembly structure according to claim 6, wherein the fixing base includes a surrounding portion that surrounds the first mounting plate and extends in a direction away from the bottom surface of the first mounting plate, an inner side of the surrounding portion has an annular inner wall, and the connecting base and the lighting module are accommodated on the inner side of the surrounding portion.

8. The ceiling fan lamp quick assembly structure according to claim 7, wherein the lighting module further includes an outer lamp cover, and a top portion of the outer lamp cover is inserted into the inner side of the annular inner wall of the surrounding portion; wherein a plurality of connecting grooves are formed on an outer side of the top portion of the outer lamp cover, and a plurality of engaging portions protruding from the annular inner wall of the surrounding portion are formed at positions on the annular inner wall of the surrounding portion corresponding to the plurality of connecting grooves; and wherein the outer lamp cover is disposed below the surrounding portion through the plurality of connecting grooves and the plurality of engaging portions being engaged with each other.

9. The ceiling fan lamp quick assembly structure according to claim 1, wherein the first engaging piece of each of the first hooks has a first guiding bevel inclined in a direction away from the first mounting plate at one end opposite to the first connecting portion, and the second engaging piece of each of the second hooks has a second guiding bevel inclined in a direction away from the top surface of the second mounting plate at one end opposite to the second connecting portion.

* * * * *